Feb. 9, 1926. 1,572,259
L. D. WOODS
DEVICE FOR FEEDING MOISTURE TO BANANA STALKS
Filed June 10, 1924
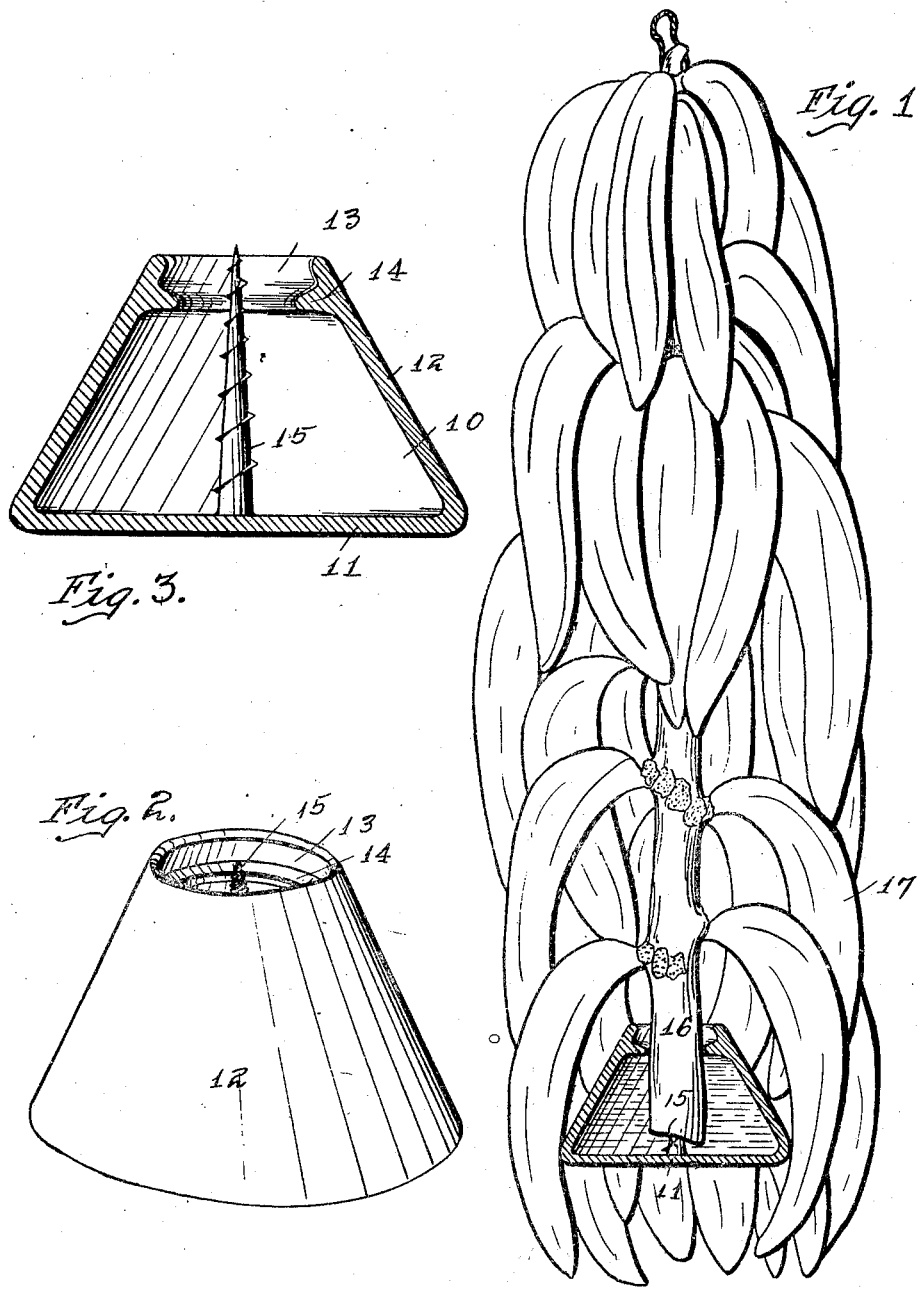

Patented Feb. 9, 1926.

1,572,259

UNITED STATES PATENT OFFICE.

LORENZO D. WOODS, OF CAMBRIDGE, IOWA, ASSIGNOR OF ONE-HALF TO JOHN A. WOODS, OF CAMBRIDGE, IOWA.

DEVICE FOR FEEDING MOISTURE TO BANANA STALKS.

Application filed June 10, 1924. Serial No. 719,122.

*To all whom it may concern:*

Be it known that I, LORENZO D. WOODS, a citizen of the United States, and a resident of Cambridge, in the county of Story and State of Iowa, have invented a certain new and useful Device for Feeding Moisture to Banana Stalks, of which the following is a specification.

The object of my invention is to provide a simple, durable and inexpensive device, which may be easily and quickly attached to the lower end of the stalk of a bunch of bananas, adapted to contain water and to supply moisture to the bananas for the purpose of prolonging the ripening of the same.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of a bunch of bananas showing the manner in which my improved device is attached to the stalk thereof, the said device being shown in section.

Figure 2 is a perspective view of my improved device.

Figure 3 is a vertical, central, sectional view of the same.

My improved device comprises a container 10 having a circular bottom member 11 and a conical wall 12, said wall member being truncated at its upper end and provided with an opening 13, which is of sufficient diameter to easily admit the large end of a stalk of bananas. An inwardly extending annular flange 14 is provided near the upper end of the wall member 10. The central portion of the bottom 11 is provided with an upwardly extending screw threaded portion 15, which provides means whereby the container 10 may be rigidly secured to the stalk 16 of the bunch of bananas 17. This is accomplished by placing the pointed end of the member 15 against the bottom face of the stalk 16 and imparting a rotary movement to the container 10, which will cause the stalk 16 to enter the opening 13 and to extend downwardly into the container 10.

The flange 14 serves to assist in preventing the water within the container 10 from being splashed out over the upper edge of the wall member 12, if the bunch of bananas should be jolted or jarred while bananas are being severed therefrom.

I have discovered that when my improved container is placed in position on the lower end of a banana stalk and water supplied thereto, that the bananas may be sustained against becoming black and overly ripe for a considerable time. I have also discovered that this adds considerably to the flavor of the fruit.

In actual practice, the bunch of bananas is hung up in the usual manner and allowed to ripen normally until the bananas have turned yellow, after which my improved container with water is applied to the stalk as above described.

The purpose of the device is to simply maintain the fruit in this ripened condition without turning black or becoming overly ripe. By forming the side walls of the container conical, the device is better adapted to fit in position beneath the overhanging bananas, as clearly illustrated in Figure 1.

It will, therefore, be seen that I have provided a new and improved method of preserving bananas, which will largely reduce the loss that has to be borne by the retailer, due to the fact that bananas ordinarily ripen and turn black quite rapidly after they have turned yellow. By my improved method, this ripening period can be greatly prolonged, and the retailer will thereby realize a considerable saving by using my improved method and my improved device for accomplishing the same.

I claim as my invention:

1. A device for supplying moisture to banana stalks, comprising a container having a bottom member and a conical shaped wall member truncated at its upper end, said bottom member having the central portion of its inner face provided with an upwardly extending screw threaded member.

2. A device for supplying moisture to banana stalks, comprising a container having a bottom member and a conical shaped wall member truncated at its upper end, said bottom member having the central portion of its inner face provided with an upwardly extending screw threaded member, the upper inner face of said wall member being provided with an inwardly extending annular flange.

Des Moines, Iowa, June 4, 1924.

LORENZO D. WOODS.